Figure 1:
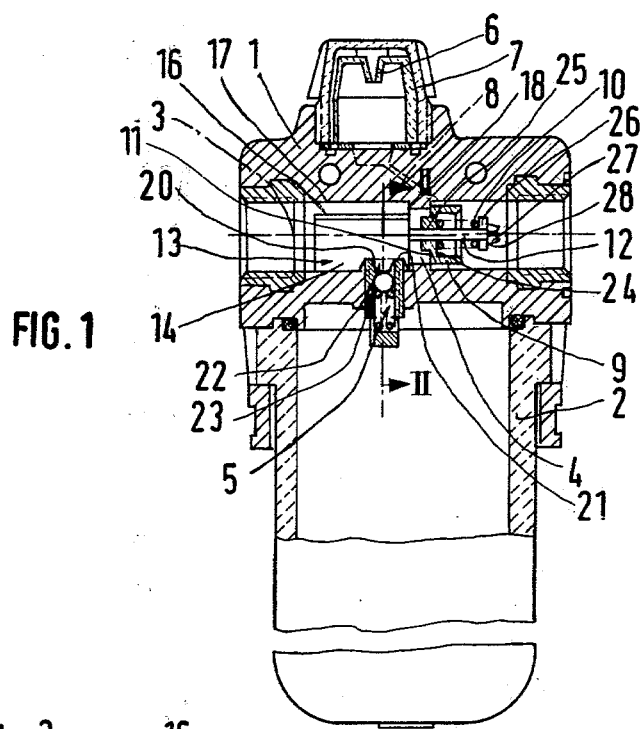

United States Patent [19]

Leger

[11] 4,205,701
[45] Jun. 3, 1980

[54] ATOMIZER FOR LUBRICANTS, ETC.

[75] Inventor: Erhard Leger, Dettenhausen, Fed. Rep. of Germany

[73] Assignee: J. Lorch Gesselschaft & Co. KG, Waldenbuch, Fed. Rep. of Germany

[21] Appl. No.: 814,928

[22] Filed: Jul. 12, 1977

[30] Foreign Application Priority Data

Jul. 16, 1976 [DE] Fed. Rep. of Germany ....... 2631992

[51] Int. Cl.$^2$ ................... F16K 15/00; F16K 15/06; F16N 7/34
[52] U.S. Cl. .............................. 137/512; 137/543.15; 184/56 R; 239/318
[58] Field of Search ...................... 137/543.15, 533.27, 137/512; 184/56 R, 56 A; 222/193; 239/318

[56] References Cited

U.S. PATENT DOCUMENTS

| Re. 24,291 | 3/1957 | Goodyer | 184/55 A |
| 654,665 | 7/1900 | Moyer | 184/56 R |
| 1,153,401 | 9/1915 | Miline | 184/56 R |
| 1,676,666 | 7/1928 | Pivoto | 137/543.15 |
| 2,633,804 | 4/1953 | Bruce | 137/543.15 |
| 3,266,597 | 8/1966 | Söchting et al. | 137/543.15 |

Primary Examiner—Martin P. Schwadron
Assistant Examiner—A. Michael Chambers
Attorney, Agent, or Firm—Watson, Cole, Grindle & Watson

[57] ABSTRACT

A liquid atomizer includes a housing having a gas flow passage therein and a constriction in the passage, a flow restrictor bearing against the constriction at the downstream side thereof, and a carrier member located upstream of the constriction. The carrier has an axial extension thereon projecting through the constriction, and the flow restrictor is spring mounted on this extension. Thus, any interference with the desired uniform liquid atomization from the passage is completely avoided.

5 Claims, 2 Drawing Figures

ATOMIZER FOR LUBRICANTS, ETC.

The present invention relates to an atomizer having a constriction located in a gas flow passage thereof. An axially movable flow restrictor is disposed, in a housing containing the passage, downstream of the constriction relative to the direction of flow, the flow restrictor being spring biased against a sealing surface of the constriction and being guided into place by a carrier axially fixed in the housing. In a known embodiment of this type, the carrier is located downstream of the constriction and, since it must be centrally disposed, the carrier has a nose extending to the wall of the gas flow passage, and it is retained on the wall by means of a screw. This nose therefore interferes with the flow, and makes assembly difficult, especially because of the need for the screw.

It is therefore an object of the present invention to provide an atomizer wherein the flow restrictor and its carrier can be easily assembled, are of simple design and, more particularly, do not hinder the flow downstream of the constriction, whereby the finest possible atomization of the lubricant may be achieved.

In carrying out this objective according to the present invention, the carrier is arranged upstream of the constriction, relative to the direction of flow, and has gates as well as centering surfaces which bear against the wall of the gas flow passage. The carrier bears against one side of the constriction, and has a central extension projecting through the constriction. An axially movable flow restrictor is supported on the extension and is spring biased in place so as to bear against an opposite side of the constriction. An annular ring is snap fitted onto the extension for retaining the flow restrictor in position. The components of the atomizer may therefore be easily fabricated, and are capable of being quickly mounted in place from opposite sides of the constriction. Thus, the carrier and the flow restrictor form one assembly retained at the constriction, without any additional means. Significant disturbances in the path of flow are thus avoided.

Figure 2:
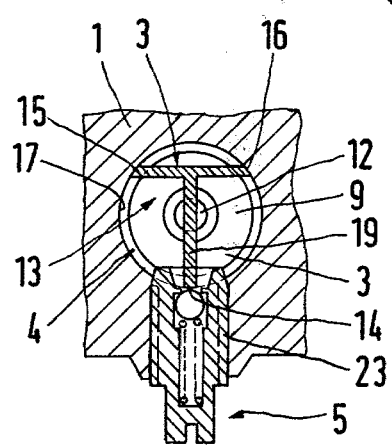

A practical example of the present invention will now be described with reference to the drawings, in which FIG. 1 is a longitudinal sectional view taken through the atomizer according to the invention, and FIG. 2 is a partial cross-sectional view thereof taken substantially along line II—II of FIG. 1.

Removably attached to a housing 1 is a container 2 for liquids. A gas flow passage 3 is located in housing 1, and a constriction 4 in the passage is disposed approximately centrally of the housing. Passage 3 communicates with container 2 upstream of the constriction by means of a slightly gas-permeable valve 5 which prevents blow-through when container 2 is removed for filling it with a liquid (such as oil) to be atomized. Gas flowing under pressure into passage 3 from the left-end thereof (as viewed in FIG. 1) forces the liquid through a regulating valve (not shown) to a drop tube 6 by means of a riser pipe (also not shown). The operation of drop tube 6 can be controlled with the aid of a sight glass 7 threaded onto housing 1. The falling drops of liquid enter gas flow passage 3 via a supply passage 8 and are atomized downstream of constriction 4, as viewed in the direction of flow.

A flow restrictor 9 is disposed in gas flow passage 3 and is spring biased against a sealing surface 11 of constriction 4 by means of a spring 10. Flow restrictor 9 and spring 10 are arranged concentrically on an extension 12 of a carrier 13 which is T-shaped in cross section. The ribs of the carrier are supported within a wall 17 of gas flow passage 3 by means of centering rib surfaces 14, 15 and 16. Centering surfaces 14 to 16 form circular arc sections complementary to the diameter of wall 17 of gas flow passage 3. One end of carrier 13 bears against a stop surface 18 of constriction 4, which is located opposite sealing surface 11. Extension 12 projects outwardly of one end of carrier 13, formed as a T-web 19 (FIG. 2), and is in the form of a cylindrical bolt located concentrically in gas flow passage 3.

T-web 19 has two notches 20, 21 therein with open edges defining insertion bevels 22 into which the hollow end of valve 5, having a threaded exterior 23, can be inserted. Thus, when valve 5 is threaded into housing 1, it positively retains carrier 13 in all directions.

Flow restrictor 9 is dish-shaped with a hole 25 in its base 24 permitting the flow restrictor to be shifted along extension 12 during assembly. One end of spring 10 bears against base 24 of flow restrictor 9, while the other end thereof bears against a support member 26 which is in the form of an annular disc mounted on extension 12. The end of extension 12 has a collar or nose 28 made resilient by a slot 27 permitting disc 26 to be snap-fitted onto extension 12.

During the assembly operation, carrier 13 is inserted into gas flow passage 3 from the left in FIG. 1 until its one end, with extension 12 extending outwardly therefrom, bears against stop surface 18 of constriction 4. Then, valve 5 is threaded in place, causing the hollow end thereof to extend into notches 20,21 thereby retaining carrier 13 in all directions. Flow restrictor 9, via hole 25 in its base, is then slid along the bolt or extension 12 of carrier 13 from the right. Spring 10 is then disposed over bolt 12 after which disc 26 is snapped in place behind stop 28 thereby causing base 24 of flow restrictor 9 to bear against sealing surface 11 of constriction 4. Assembly and adjustment of the individual components of the present atomizer can therefore be accomplished quite quickly and simply. Since no bothersome, non-concentric components are disposed downstream of constriction 4 in passage 3, the gas may flow therethrough with the desired uniform swirling effect to thus atomize the lubricant. And, with valve 5 mounted in place as aforedescribed, container 2 may be removed from housing 1 via a valve (not shown) after air relief, and may be refilled, for example.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A liquid atomizer device which comprises
a housing which has an inner wall forming a gas flow passage therethrough, said inner wall including means forming a constriction in said gas flow passage, said means forming said constriction including opposed side surfaces,
a carrier member positioned in said gas flow passage on one side of said means forming a constriction, said carrier member including centering surfaces which extend to and contact the inner wall of said housing to maintain said carrier member centered in said gas flow passage, one of said centering surfaces including means forming a pair of spaced apart notches, said carrier member also including a surface engageable with the adjacent side surface of said opposed side surfaces upstream of said means forming said constriction, said carrier member also including an extension means mounted on and projecting from said centering surfaces in said gas flow passage through and beyond said constriction therein, said extension means including a spring-mount portion near the end thereof opposite the end connected to said centering surfaces, a flow restrictor mounted on said extension means so as to be movable along said extension means, said flow restrictor being of a size capable of engaging the other side surface of said opposed side surfaces downstream of said means forming said constriction opposite the side adjacent said centering surfaces of said carrier member, a spring means mounted between said flow restrictor and said spring-mount portion of said extension means so as to bias said flow restrictor toward the adjacent side surface of said constriction means, means for retaining said flow restrictor on said extension means and a removable valve means mounted on said housing having an end which extends into said gas flow passage, said valve means having a hollow cylindrical member, an end of which extends into said notches, said cylindrical member retaining said carrier member in a fixed position along said gas flow passage.

2. The atomizer according to claim 1, wherein said gas flow passage is in the form of a hollow cylinder, wherein said carrier member is co-axial with said passage, and wherein said carrier member includes at least a pair of intersecting ribs.

3. The atomizer according to claim 1, wherein said carrier member comprises three ribs and is T-shaped in cross-section, and wherein said extension means comprises an elongated cylindrical bolt.

4. The atomizer according to claim 1, wherein said flow restrictor is dish-shaped with an open end thereof facing away from said constriction, said flow restrictor having a base containing a central hole of a size equal to the cross-sectional size of said extension so as to facilitate centrally mounting said flow restrictor on said extension.

5. The atomizer according to claim 1, wherein said spring-mount portion comprises a resilient collar formed at a distal end of said extension, and a disc capable of being snap-fitted over said collar, said disc bearing against said spring member.

* * * * *

UNITED STATES PATENT OFFICE
CERTIFICATE OF CORRECTION

PATENT NO. : 4,205,701
DATED : June 3, 1980
INVENTOR(S) : Erhard Leger

It is certified that error appears in the above-identified patent and that said Letters Patent are hereby corrected as shown below:

In the title page, correct the name of the assignee to read "Festo-Mashinenfabrik Gottlieb Stoll, Esslingen, Federal Republic of Germany".

Signed and Sealed this

Ninth Day of September 1980

[SEAL]

*Attest:*

SIDNEY A. DIAMOND

*Attesting Officer*  *Commissioner of Patents and Trademarks*